US011220887B1

(12) United States Patent
Carter

(10) Patent No.: US 11,220,887 B1
(45) Date of Patent: *Jan. 11, 2022

(54) METHOD AND APPARATUS FOR CLEANING AND INSPECTING OIL WELL DRILLING MUD FLOW LINES

(71) Applicant: TRI-STATE ENVIRONMENTAL, LLC, Houma, LA (US)

(72) Inventor: Anthony Scott Carter, Petal, MS (US)

(73) Assignee: TRI-STATE ENVIRONMENTAL, LLC, Houma, LA (US)

(*) Notice: Subject to any disclaimer, the term of this patent is extended or adjusted under 35 U.S.C. 154(b) by 277 days.

This patent is subject to a terminal disclaimer.

(21) Appl. No.: 16/158,025

(22) Filed: Oct. 11, 2018

Related U.S. Application Data

(63) Continuation of application No. 15/162,460, filed on May 23, 2016, now Pat. No. 10,125,577.
(Continued)

(51) Int. Cl.
E21B 41/00 (2006.01)
E21B 21/00 (2006.01)
(Continued)

(52) U.S. Cl.
CPC ............. E21B 41/00 (2013.01); B08B 9/04 (2013.01); B08B 9/0495 (2013.01); E21B 21/00 (2013.01);
(Continued)

(58) Field of Classification Search
CPC .......... E21B 37/00; E21B 37/10; E21B 21/00; F16L 2101/12
See application file for complete search history.

(56) References Cited

U.S. PATENT DOCUMENTS 1,340,295 A * 5/1920 Russell .................. E21B 37/00
166/111
1,432,649 A * 10/1922 Wessels .................. E21B 37/08
166/173
6,325,305 B1 * 12/2001 Kuhlman ................ E21B 37/00
166/222

* cited by examiner

Primary Examiner — Natasha N Campbell
(74) Attorney, Agent, or Firm — Garvey, Smith & Nehrbass, Patent Attorneys, L.L.C.; Charles C. Garvey, Jr.; Mackenzie D. Rodriguez

(57) ABSTRACT

The present invention is directed to a method of cleaning and inspection of drilling mud carrying flow lines, each flow line having an inner surface. The method includes affixing a fitting to the flow line, the fitting having a main flow channel and a branch flow channel extending at an angle from said main flow channel. A first end portion of the fitting can have an attachment that enables connection of the fitting to the flow line at one flow line end portion. A second end portion of the fitting can have one or more doors that can be moved between opened and closed positions, the door or doors providing an opening that is not closed when the doors are in the closed position. A suction line can be connected to the branch flow channel. A cleaning tool can be guided first into the fitting and then into the flow line using a fluid carrying cable. The cleaning tool and jetting fluid can be used to clean drilling mud and debris from the inner surface of the flow line. The jetting fluid can be removed via the branch flow channel using the suction line. The cable can extend through the door opening or openings when the door or doors are in the closed position. A camera can be guided into the flow line using a camera cable wherein the camera cable extends through the door opening or openings. The cleaning tool is preferably too small to fit through the door opening.

26 Claims, 6 Drawing Sheets

Related U.S. Application Data

(60) Provisional application No. 62/164,985, filed on May 21, 2015.

(51) Int. Cl.
*B08B 9/049* (2006.01)
*B08B 9/04* (2006.01)
*F16L 55/46* (2006.01)
*G01M 3/00* (2006.01)
*F16L 101/12* (2006.01)

(52) U.S. Cl.
CPC .............. *F16L 55/46* (2013.01); *G01M 3/005* (2013.01); *F16L 2101/12* (2013.01)

METHOD AND APPARATUS FOR CLEANING AND INSPECTING OIL WELL DRILLING MUD FLOW LINES

CROSS-REFERENCE TO RELATED APPLICATIONS

This is a continuation of U.S. patent application Ser. No. 15/162,460, filed 23 May 2016, now U.S. Pat. No. 10,125,577, which application claims the benefit of U.S. Provisional Patent Application Ser. No. 62/164,985, filed 21 May 2015, all of which are incorporated herein by reference. Priority of US 10 Provisional Patent Application Ser. No. 62/164,985, filed 21 May 2015 is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to the cleaning and inspection of oil well drilling mud carrying flow lines. More particularly, the present invention relates to a method and apparatus for cleaning flow lines that carry oil and gas well drilling mud wherein a specially configured fitting enables the flow lines to be inspected before and after cleaning. Even more particularly, the present invention relates to an improved method and apparatus for cleaning and inspecting oil well drilling mud flow lines wherein a specifically configured fitting enables safe cleaning of the flow lines wherein a single aperture accommodates either camera or cleaning tool and related cables with doors that can be opened for insertion of larger cleaning tool or camera.

2. General Background of the Invention

Pipe systems are typically used to carry drilling mud on oil and gas drilling platforms. Drilling mud is a thick and viscous material that can adhere to the inner surface of the pipe bore and its fittings over time. Eventually this caked on drilling mud must be removed because it reduces the effective inside diameter of the pipe, thus reducing flow rates.

BRIEF SUMMARY OF THE INVENTION

The present invention relates to a method of cleaning and inspecting drilling mud carrying flow lines. Such flow lines each have an inner surface surrounding a flow bore. The method and apparatus includes the affixation of a specially configured fitting to a selected flow line that has been used to carry drilling mud.

The fitting includes a main flow channel with a central axis and a branch flow channel extending at an angle (e.g., 45 degrees) from the main flow channel axis.

A first end portion of the fitting has an attachment (e.g., flange) that enables connection of the fitting to the flow line, a pipe flange or other opening.

The second end portion of the fitting can have one or more movable doors that can be moved between opened and closed positions. The doors have an opening for a cleaning bore or camera cable even when the door or doors are in a closed position. The opening is preferably sized and shaped to enable a cleaning fluid hose or camera cable to pass through. The opening is preferably of a small diameter so that a cleaning tool which is affixed to the end of the cleaning hose cannot pass through.

A branch flow line is preferably provided on the fitting to which is connected a suction line.

The method includes the guiding of a cleaning tool into the fitting and then into the flow line to be cleaned preferably using a fluid carrying cable. The fluid carrying cable carries pressurized fluid that is suitable for cleaning via a jet type cleaning tool. The cleaning tool preferably jets fluid to the inner surface of the flow line for cleaning away drilling mud, scale, debris and the like from the inner surface of the flow line. In order to prevent escape of the cleaning tool from the pipe system and fitting, the opening preferably allows the hose to pass but not the cleaning tool. In this fashion, the door or doors prevent a backward travel of the cleaning tool which could result in injury to nearby workers or technicians.

The method includes removing the jetting fluid (and any debris, scale or the like) via the branch flow line in a continuous fashion during cleaning. A suction to which is preferably attached to the branch line and can be used for removing cleaning fluid and debris continuously.

The door or doors preferably remain in the closed position during cleaning, the fluid carrying cable extending through the door opening or openings as the cleaning tool moves through the piping system.

After cleaning is completed, a video camera can be guided into the fitting and then into the flow line using a camera cable, wherein the camera cable extends through the door opening or openings.

While the cleaning tool is preferably sized and shaped to fit inside the bore of the pipe to be cleaned, the cleaning tool is too large to fit through the door opening when the door or doors are closed.

Opening of the door or doors preferably enables the cleaning tool (or a camera) to enter the fitting and flow line.

In one embodiment, there are a pair of said doors and wherein the door opening can be formed when the doors are moved to the closed position.

In one embodiment, the fitting main channel and branch channel can form an acute angle.

In one embodiment, the cleaning tool preferably travels through the main flow channel of the fitting.

In one embodiment, the suction preferably includes a suction flow line connected to the branch flow line and a pump attached to the suction flow line.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 9 is a partial perspective view of the preferred embodiment of the apparatus of the present invention;

DETAILED DESCRIPTION OF THE INVENTION

Figure 1:
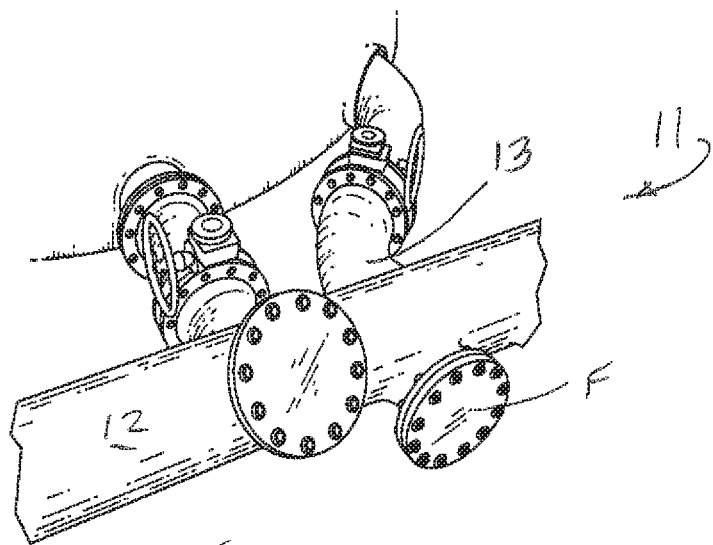
FIG. 1 is a perspective view of a drilling mud piping system.
Figure 2:
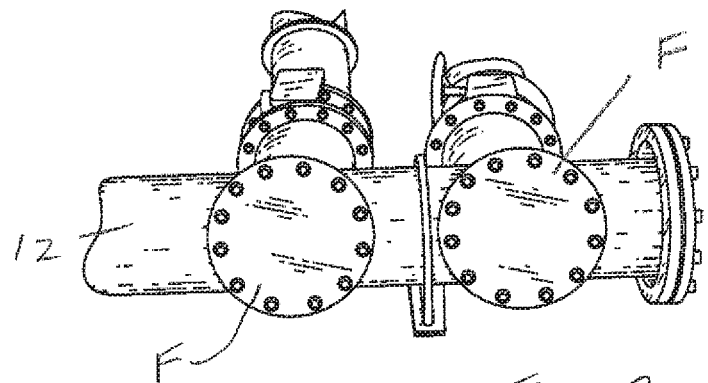
FIG. 2 is a perspective view of a drilling mud piping system.
Figure 3:
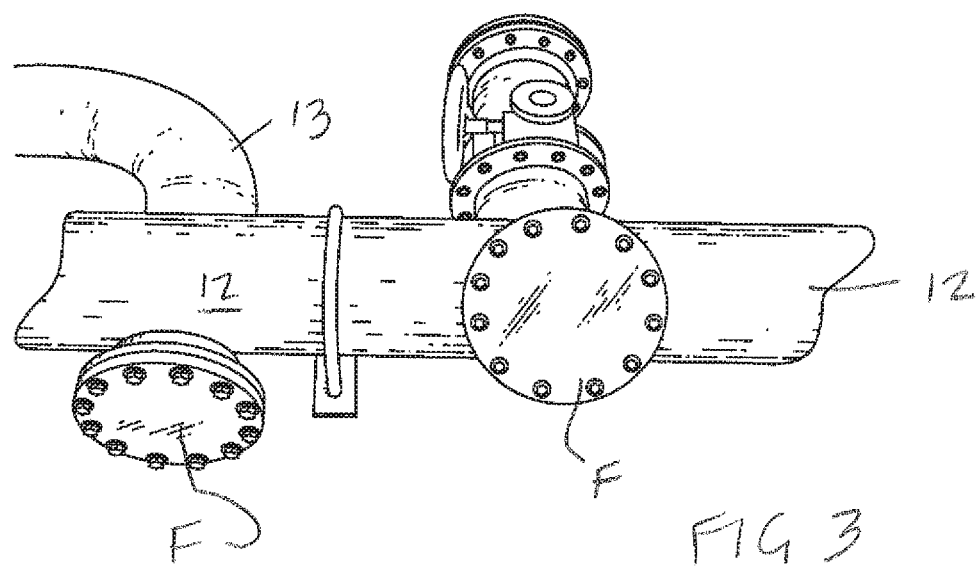
FIG. 3 is a perspective view of a drilling mud piping system.
Figure 4:
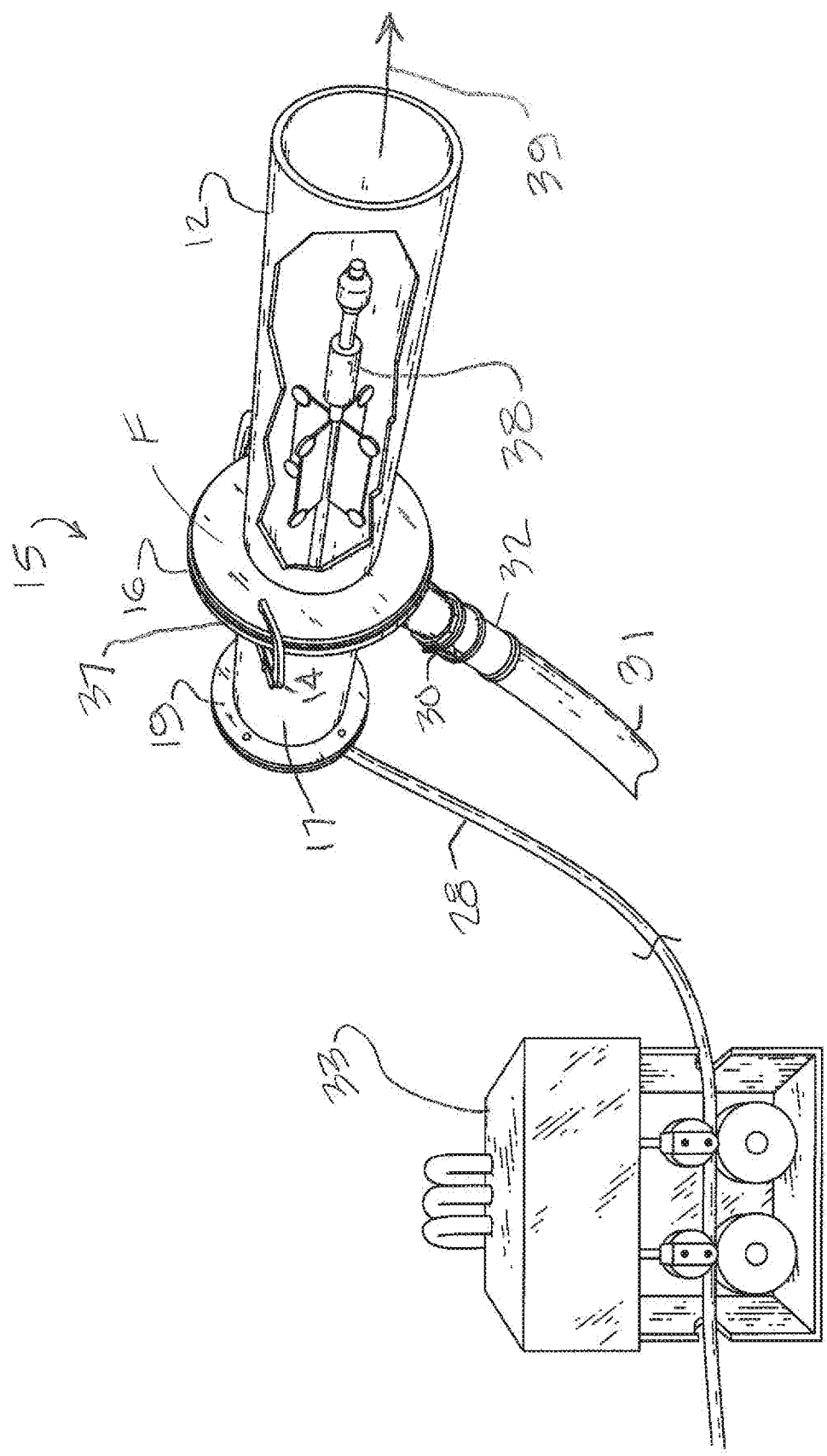
FIG. 4 is a perspective view of the preferred embodiment of the apparatus of the present invention.

FIGS. 1-9 show a preferred embodiment of the apparatus of the present invention. In FIGS. 1-3, there can be seen a pipe system, pipe section, spool piece or piping arrangement 11 that has been used to carry drilling mud on an oil and gas drilling platform. It should be understood that the piping system 11 shown in FIGS. 1-3 is an example of a drilling mud conveying piping system to be cleaned. Drilling mud is a thick and viscous material that can adhere to the inner surface of the pipe 12 bore and its pipe fittings 13 over time. The piping section 11 can include pipe 12 as well as pipe fittings 13 such as elbows or ells, tee fittings or other pipe fittings 13. Eventually this caked on drilling mud must be removed because it reduces the effective inside diameter of the pipe 12, reducing flow rates.

Such piping systems or spool pieces 11 have fittings such as an annual flange F to which the fitting 15 of the present invention can be affixed for cleaning.

Fitting or safety cap apparatus 15 is preferably attached to the flange F using clamps/fixtures or the other attachments 14. The fitting or safety cap apparatus 15 has a pipe flange 16 on one end portion and a second flange 19 at another end portion as shown, for example, in FIG. 8. Safety cap apparatus 15 includes a cylindrically shaped section 17 having a bore 18. The cylindrical section 17 includes flange 16 and flange 19. Flanges 16, 19 can be annular flanges. Fitting 15 can be connected to flange F with a rubber seal 37 in between flange 16 and flange F (see FIGS. 4, 7, and 9). At flange 19, a pair of doors 20, 21 can be affixed. Each of the doors 20, 21 can be pivotally attached to the fitting 15.

Figure 5:
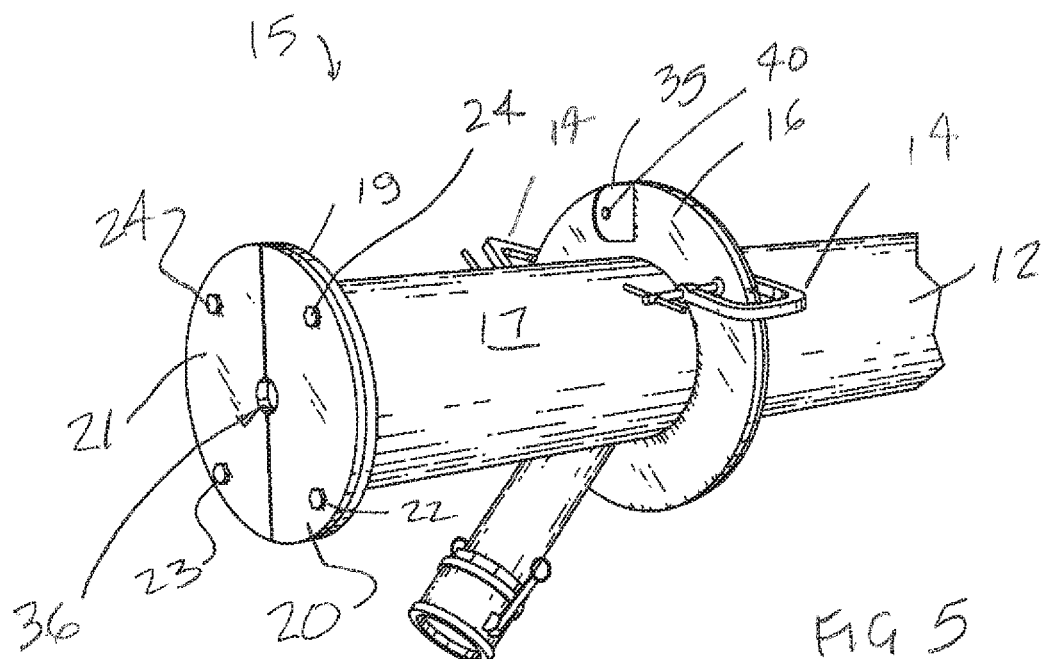
FIG. 5 is a partial perspective view of the preferred embodiment of the apparatus of the present invention.
Figure 6:
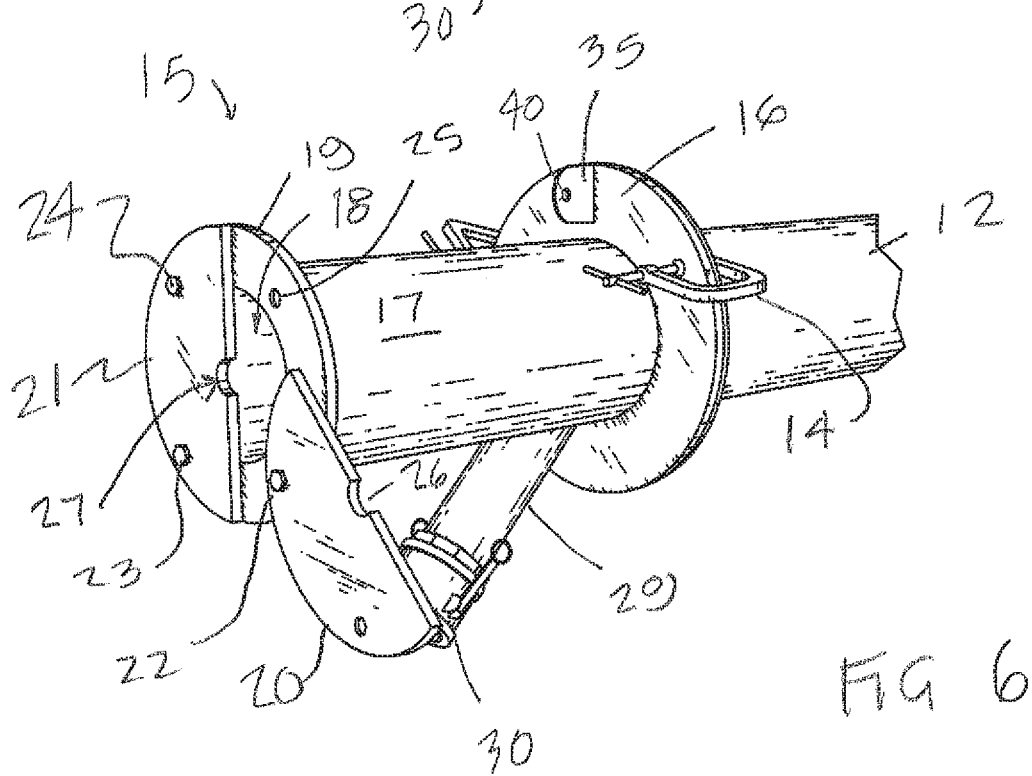
FIG. 6 is a partial perspective view of the preferred embodiment of the apparatus of the present invention.
Figure 7:
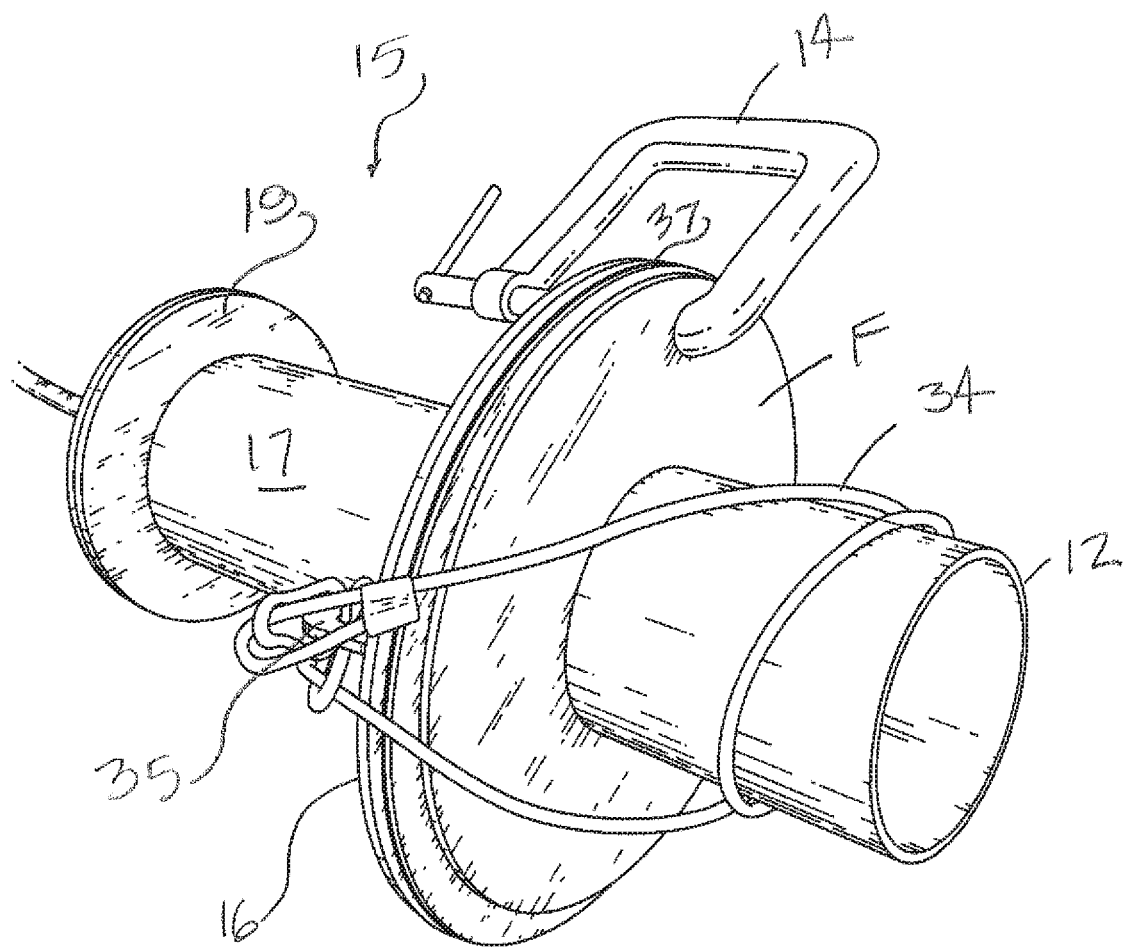
FIG. 7 is a partial perspective view of the preferred embodiment of the apparatus of the present invention.
Figure 8:
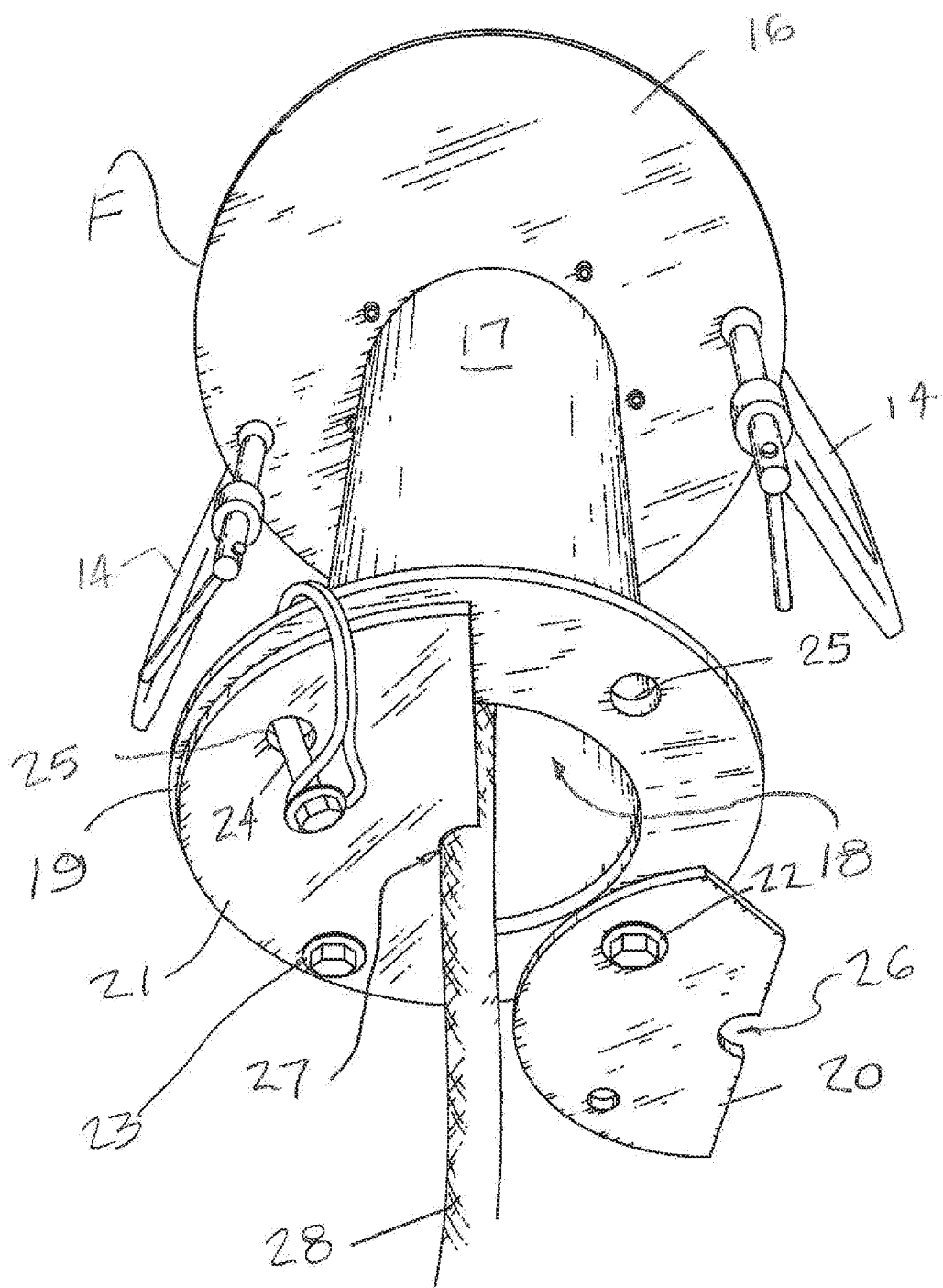
FIG. 8 is a partial perspective view of the preferred embodiment of the apparatus of the present invention.
Figure 6:
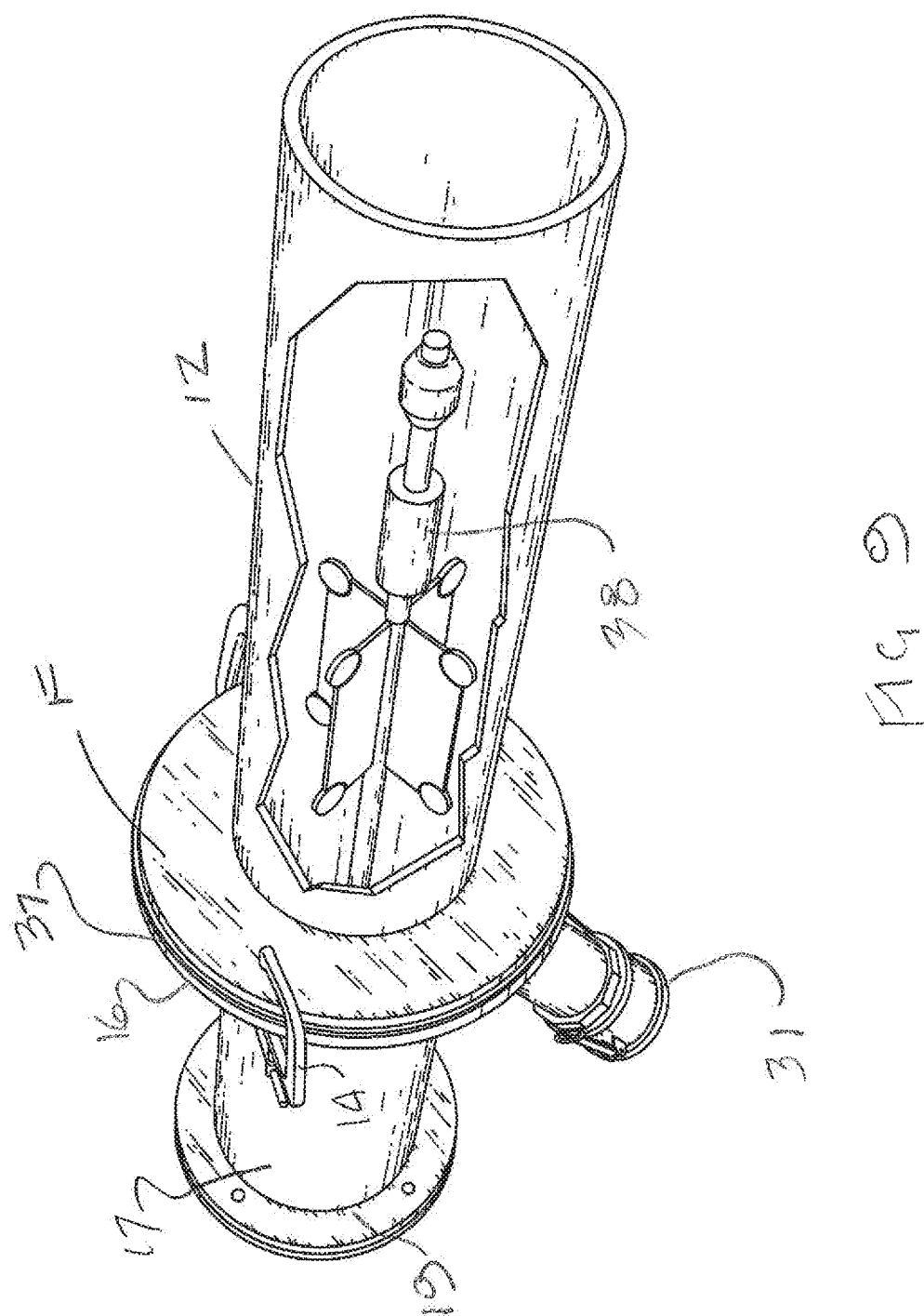

In FIGS. 5-6, 9, there can be seen a first door 20 and a second door 21. Door 20 has a slot or semicircular opening 26. Door 21 has a slot or semicircular opening 27. In FIGS. 6 and 8, door 20 is in an open position exposing bore 18. In FIGS. 5, 6 and 8, door 21 is in a closed position. Notice in the closed position of FIGS. 6 and 9 that slot or opening 27 closely conforms to fluid carrying hose 28. In FIG. 5, both doors 20, 21 are closed or in a closed position. Hose 28 can be fed into bore 18 via opening 36 for advancing cleaning tool 38 into the pipe or pipes 12 of piping system 11 in the direction of arrow 39 in FIG. 4. Hose feed 33 can be a commercially available hose feed device such as the STONE AGE AUTOBOX (Model ABX-500).

In the doors 20, 21 closed position of FIG. 5, the slots or openings 26, 27 form a circular aperture 36 preferably having a diameter that is equal to or slightly larger than the outer diameter of hose 28. However, the aperture 36 preferably has a diameter that is smaller than the diameter or transverse dimension of a cleaning tool 38 that is affixed to the end of hose 28. Such a cleaning tools 38 can be water blasting or pressure washing heads known in the art and commercially available. The smaller diameter aperture 36 prevents escape via backward travel of the cleaning tool 38 on hose 28 which escape could cause injury to nearby persons.

Each door 20, 21 can be pivotally attached at pivots or bolted connections 22, 23 to flange 19. Flange 19 can thus provide multiple flange openings 25 for accepting bolted connections or pivots 22, 23 or pins 24 as seen in FIGS. 6 and 8.

Locking or pinned connections 24 can be used to secure each door 20, 21 in the closed position (see FIGS. 5-6 and 8). In FIG. 5, the combination of bolted connections or pivots 22, 23 and locking pins 24 each hold door 20, 21 in the closed position.

Branch line 29 has an internal bore that is in fluid communication with the bore 18 of fitting 15. Branch line 29 connects with suction hose 31 using interlocking fittings 32 (on hose 31) and 30 (on branch line 29). Suction hose 31 connects at one end to fitting 15 and at its other end to a pump that produces suction in line 31. Suction line 31 continuously removes cleaning fluid from the piping system 11 as it is injected via hose 28 and its cleaning tool 38. The removed fluid also contains removed particulate matter including caked on drilling mud, scale, rust and debris. The pump can then discharge the collected cleaning fluid, drilling mud, scale, rust and debris into a collection vessel for disposal, separation or processing.

In FIG. 8, a padeye 35 on fitting 15 enables connection to fitting 15 of a safety cable 34. Flange 16 provides a padeye opening 40 for attaching padeye 35. Cable 34 is preferably wrapped around the pipe section or spool piece 11 or pipe 12 and then connected to padeye 35 using a fastener such as a shackle.

The following is a list of parts and materials suitable for use in the present invention:

| PARTS LIST: | |
| --- | --- |
| PART NUMBER | DESCRIPTION |
| 10 | cleaning system/inspection system |
| 11 | pipe section/spool piece/piping system |
| 12 | pipe |
| 13 | elbow/ell/pipe fitting/Tee fitting pipe |
| 14 | clamp/fixture |
| 15 | fitting/safety cap apparatus |
| 16 | annular flange/pipe flange |
| 17 | cylindrical section |
| 18 | bore |
| 19 | flange |
| 20 | door |
| 21 | door |
| 22 | pivot/bolted connection |
| 23 | pivot/bolted connection |
| 24 | locking pin/pinned connection |
| 25 | flange opening |
| 26 | door opening/semicircular opening |
| 27 | door opening/semicircular opening |
| 28 | fluid carrying hose |
| 29 | branch line |
| 30 | fitting |
| 31 | suction hose |
| 32 | fitting/hose fitting/connector |
| 33 | hose feed |
| 34 | safety cable |
| 35 | padeye |
| 36 | circular aperture/opening |
| 37 | rubber seal |
| 38 | cleaning tool |
| 39 | arrow |
| 40 | padeye opening |
| F | inlet flange/annular flange/pipe flange/blind flange |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A method of cleaning and inspection of a drilling mud carrying flow line, the flow line having an inner surface, comprising the steps of:
   a) affixing a fitting to the flow line, said fitting having a main flow channel and a branch flow channel;
   b) a first end portion of the fitting having an attachment that enables connection of the fitting to the flow line at one flow line end portion;
   c) a second end portion of the fitting having one or more doors that can be moved between opened and closed positions, the one or more doors providing an opening that is not closed when the one or more doors are in the closed position;
   d) connecting a conduit to said branch flow channel;
   e) guiding a cleaning tool first into the fitting and then into the flow line, the cleaning tool having an attached fluid carrying cable;
   f) using the cleaning tool and jetting fluid to clean debris from the inner surface of the flow line;
   g) removing the jetting fluid of step "f" via the branch flow channel using the conduit of step "d";
   h) wherein in step "f" the one or more doors are in the closed position, the cable extending through the door opening;
   i) wherein the cleaning tool is too large to fit through the door opening;
   j) opening the one or more doors during step "e" so that the cleaning tool can enter the flow line; and
   k) closing the one or more doors after step "j".

2. The method of claim 1, wherein in step "c" there are a pair of said doors and wherein said door opening is formed when the doors are moved to the closed position.

3. The method of claim 1, wherein in step "a" the fitting main channel and branch channel form an acute angle.

4. The method of claim 1, wherein in step "e" the cleaning tool travels through the main flow channel of the fitting.

5. The method of claim 1, wherein in step "g" the conduit includes a suction flow line connected to the branch flow channel and a pump attached to the suction flow line.

6. A method of cleaning and inspection of a drilling mud carrying flow line, the flow line having an inner surface, comprising the steps of:
   a) affixing a fitting to the flow line, said fitting having a main flow channel and a branch flow channel extending at an angle from said main flow channel;
   b) a first end portion of the fitting having an attachment that enables connection of the fitting to the flow line at one flow line end portion;
   c) a second end portion of the fitting having one or more doors that can be moved between opened and closed positions, the one or more doors providing an opening that is not closed when the doors are in the closed position;
   d) connecting a conduit to said branch flow channel;
   e) guiding a cleaning tool first into the fitting and then into the flow line, said cleaning tool attached to a fluid carrying cable;
   f) using the cleaning tool and jetting fluid to clean debris from the inner surface of the flow line;
   g) removing the jetting fluid of step "f" via the conduit;
   h) wherein in step "e" the one or more doors are in the closed position, the cable extending through the door opening;
   i) wherein the cleaning tool is too large to fit through the door opening;
   j) opening the one or more doors during step "e" so that the cleaning tool can enter the flow line; and
   k) closing the one or more doors after step "j".

7. The method of claim 6, wherein in step "c" there are a pair of said doors and wherein said door opening is formed when the doors are moved to the closed position.

8. The method of claim 6, wherein in step "a" the fitting main channel and branch channel form an acute angle.

9. The method of claim 6, wherein in step "e" the cleaning tool travels through the main flow channel of the fitting.

10. The method of claim 6, wherein in step "f" the conduit includes a suction flow line connected to the branch flow channel and a pump attached to the suction flow line.

11. A method of cleaning and inspection of a drilling mud carrying flow line, the flow line having an inner surface, comprising the steps of:
    a) affixing a fitting to the flow line, said fitting providing an outer wall surrounding an open ended flow channel that has first and second end portions with first and second openings at said first and second end portions and a branch flow channel in between said first and second end portions;
    b) a first end portion of the fitting having an attachment that enables connection of the fitting to the flow line at one flow line end portion;
    c) the fitting having a second end portion spaced away from said first end portion and having one or more doors that can be moved between opened and closed positions, the door or doors in the opened position providing a door opening of a first diameter, and the door or doors in the closed position providing a door opening of a second diameter that is smaller than the first diameter;
    d) connecting a conduit to said branch flow channel in between said first and second end portions;
    e) guiding a cleaning tool first into the fitting and then into the flow line using a jetting fluid carrying cable having a third diameter that is smaller than said second diameter;
    f) using the cleaning tool and the jetting fluid of step "e" to clean debris from the inner surface of the flow line;
    g) removing the jetting fluid of steps "e" and "f" via the branch flow channel using the conduit of step "d";
    h) wherein in step "f" when said door or doors are in the closed position, and the cable occupies the door opening;
    i) guiding a camera into the flow line using a camera cable wherein the camera cable extends through the door opening;
    j) wherein the cleaning tool is too large to fit through the door opening when the door or doors are in the closed position;
    k) opening the door or doors during step "e" so that the cleaning tool can bypass the door or doors and enter the flow line; and
    l) closing the door or doors after step "j".

12. The method of claim 11, wherein in step "c" there are a pair of said doors and wherein said door opening is formed when the doors are moved to the closed position.

13. The method of claim 11, wherein in step "e" the cleaning tool travels through the main flow channel of the fitting.

14. The method of claim 11, wherein in step "g" the conduit includes a suction flow line connected to the branch flow channel and a pump attached to the suction flow line.

15. The method of claim 11 wherein in step "a" there are no other openings in said fitting other than said first and second openings and said branch flow channel.

16. The method of claim 11 wherein the fitting has a cylindrically shaped portion.

17. The method of claim 12 wherein each door has a semicircular recess and said semicircular recesses form said door opening in said closed position.

18. The method of claim 12 wherein each door has a semicircular periphery.

19. A method of cleaning and inspection of a drilling mud carrying flow line, the flow line having an inner surface, comprising the steps of:
   a) affixing a fitting to the flow line, said fitting providing an outer wall surrounding an open ended flow channel that has first and second end portions with first and second openings at said first and second end portions and a branch flow channel in between said first and second end portions;
   b) a first end portion of the fitting having an attachment that enables connection of the fitting to the flow line at one flow line end portion;
   c) the fitting having a second end portion spaced away from said first end portion and having one or more doors that can be moved between opened and closed positions, the door or doors providing an opening of a first diameter when the doors are in the opened position and a second diameter that is smaller than the first diameter that is not closed when the doors are in the closed position;
   d) connecting a discharge line to said branch flow channel in between said first and second end portions;
   e) guiding a cleaning tool first into the fitting and then into the flow line using a jetting fluid carrying cable having a third diameter that is smaller than said second diameter;
   using the cleaning tool and the jetting fluid of step "e" to clean debris from the inner surface of the flow line;
   g) removing the jetting fluid of steps "e" and "f" via the discharge line of step "d";
   h) wherein in step "f" when said door or doors are in the closed position, and the cable occupies the door opening;
   i) wherein the cleaning tool is too large to fit through the door opening when the door or doors are in the closed position;
   j) opening the door or doors during step "e" so that the cleaning tool can enter the flow line; and
   k) closing the door or doors after step "j".

20. The method of claim 19, wherein in step "c" there are a pair of said doors and wherein said door opening is formed when the doors are moved to the closed position.

21. The method of claim 19, wherein in step "e" the cleaning tool travels through the main flow channel of the fitting.

22. The method of claim 19, wherein in step "g" the discharge line includes a flow line connected to the branch flow channel and a pump attached to the suction flow line.

23. The method of claim 19 wherein in step "a" there are no other openings in said fitting other than said first and second openings and said branch flow channel.

24. The method of claim 19 wherein the fitting has a cylindrically shaped portion.

25. The method of claim 20 wherein each door has a semicircular recess and said semicircular recesses form said door opening in said closed position.

26. The method of claim 20 wherein each door has a semicircular periphery.

* * * * *